United States Patent
Velusamy et al.

(10) Patent No.: US 12,309,737 B2
(45) Date of Patent: May 20, 2025

(54) TRANSITION FROM BACKUP SMF TO PRIMARY SMF

(71) Applicant: T-Mobile USA, Inc., Bellevue, WA (US)

(72) Inventors: Saravana Velusamy, Overland Park, KS (US); Narayanan Govindan Kasi, Olathe, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 508 days.

(21) Appl. No.: 17/725,403

(22) Filed: Apr. 20, 2022

(65) Prior Publication Data

US 2023/0345403 A1 Oct. 26, 2023

(51) Int. Cl.
*H04W 60/04* (2009.01)
*H04W 48/16* (2009.01)
*H04W 60/06* (2009.01)
*H04W 76/19* (2018.01)

(52) U.S. Cl.
CPC .......... *H04W 60/04* (2013.01); *H04W 48/16* (2013.01); *H04W 60/06* (2013.01); *H04W 76/19* (2018.02)

(58) Field of Classification Search
CPC ..... H04W 60/04; H04W 60/06; H04W 48/16; H04W 24/04; H04W 4/90; H04W 76/18; H04W 76/25; H04W 76/19; H04W 36/12; H04W 36/0033; H04W 28/088; H04W 8/00; H04W 88/14; H04W 80/10
See application file for complete search history.

(56) References Cited

U.S. PATENT DOCUMENTS

| 6,067,545 A * | 5/2000 | Wolff | H04L 67/1031 709/200 |
| 2010/0220656 A1* | 9/2010 | Ramankutty | H04L 45/28 370/328 |

(Continued)

FOREIGN PATENT DOCUMENTS

| CN | 101272614 A * | 9/2008 | H04W 28/08 |
| CN | 103703832 A * | 4/2014 | H04W 36/0022 |

(Continued)

OTHER PUBLICATIONS

UE-based Network Access Timing Control Scheme for Avoiding Signaling Spikes (Year: 2015).*

(Continued)

*Primary Examiner* — Peter Chen
*Assistant Examiner* — Guoxing Fan
(74) *Attorney, Agent, or Firm* — Lee & Hayes, P.C.

(57) ABSTRACT

A Session Management Function (SMF) of a 5G core network can serve as a backup SMF for UEs associated with a particular Tracking Area Code (TAC). If a primary SMF for the TAC is unavailable, UEs can be assigned to the backup SMF for the TAC. The backup SMF can determine, by querying a Network Repository Function (NRF), when the primary SMF for the TAC becomes available. When the backup SMF determines that the primary SMF for the TAC may be available, the backup SMF can cause connected UEs associated with the TAC to detach from the backup SMF and the core network, such that the UEs can re-attach to the core network and be re-assigned to the primary SMF for the TAC.

20 Claims, 4 Drawing Sheets

(56) References Cited

U.S. PATENT DOCUMENTS

| | | | | |
|---|---|---|---|---|
| 2012/0207013 A1* | 8/2012 | Kamalaraj | ............ | H04W 8/065 |
| | | | | 370/328 |
| 2015/0124585 A1* | 5/2015 | Sahin | .................... | H04W 36/12 |
| | | | | 370/218 |
| 2019/0380080 A1* | 12/2019 | Schliwa-Bertling | ......................... | |
| | | | | H04W 28/088 |
| 2020/0267049 A1* | 8/2020 | Suryanarayanarao | ....................... | |
| | | | | H04W 24/04 |
| 2022/0014944 A1 | 1/2022 | Liang et al. | | |
| 2022/0022062 A1 | 1/2022 | Zhu et al. | | |
| 2022/0369196 A1* | 11/2022 | Kodaypak | ............ | H04W 48/18 |

FOREIGN PATENT DOCUMENTS

| | | | | | |
|---|---|---|---|---|---|
| CN | 111901401 A | * | 11/2020 | ......... | H04L 67/1002 |
| CN | 113438664 A | * | 9/2021 | | |
| CN | 115379535 A | * | 11/2022 | ............ | H04W 48/16 |
| KR | 10-2012-0059751 | * | 6/2012 | | |
| WO | WO-2019193129 A1 | * | 10/2019 | ............ | H04W 48/16 |
| WO | WO-2020199620 A1 | * | 10/2020 | | |

OTHER PUBLICATIONS

Ultra Cloud Core 5G Session Management Function, Release 2021.01—Configuration and Administration Guide (Year: 2021).*

\* cited by examiner

TRANSITION FROM BACKUP SMF TO PRIMARY SMF

BACKGROUND

A core network of a fifth generation (5G) telecommunication network can include various types of network functions, such as Access and Mobility Management Functions (AMFs) and Session Management Functions (SMFs). When a user equipment (UE), such as a mobile phone, attaches to the telecommunication network, an AMF can select an SMF to manage communication sessions for the UE.

Individual SMFs can be associated with various tracking area codes (TACs). A particular SMF may be a primary SMF for a particular TAC, but one or more other SMFs may be backup SMFs for that TAC. If the primary SMF for a TAC is offline or is experiencing other issues, an AMF may direct UEs associated with that TAC to a backup SMF that is also configured to handle traffic for UEs associated with the TAC. Accordingly, the backup SMF can manage communication sessions for the UEs associated with the TAC.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
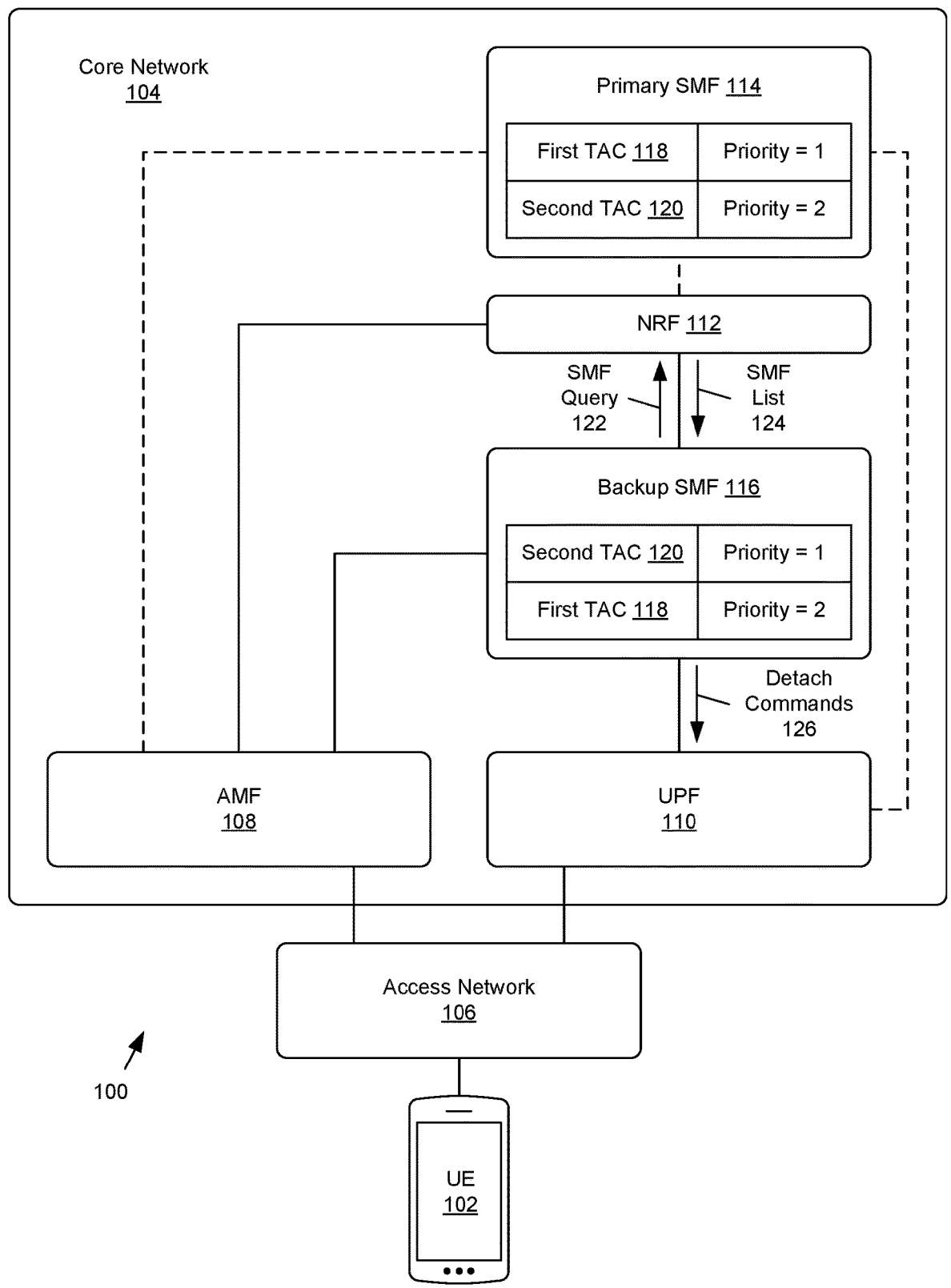
FIG. 1 shows an example of a network environment in which UEs can connect to a telecommunication network.

An Access and Mobility Management Function (AMF) in a 5G core network can be configured to assign UEs to available Session Management Functions (SMFs) in the 5G core network. The SMFs can be configured to manage communication sessions for UEs associated with various Tracking Area Codes (TACs). Different TACs can correspond to different tracking areas, such as different geographical regions. For example, a particular SMF can be configured to be a primary SMF for UEs in a tracking area associated with a particular TAC. However, one or more other SMF's can be configured to be backup SMFs for UEs associated with that TAC.

In some situations, a primary SMF for a particular TAC may go offline, or may experience other issues that prevent the primary SMF from managing sessions for UEs associated with that particular TAC. For example, the primary SMF for a TAC may be taken offline for maintenance, may become overloaded, or may experience internal errors that put the primary SMF in an unhealthy state and prevent the primary SMF from functioning normally. In such situations, an AMF can assign UEs associated with the TAC to a backup SMF that is also configured to process traffic associated with the TAC.

As a non-limiting example, a first SMF may be configured to be a primary SMF for a first TAC associated with Dallas, Texas, and to be a backup SMF for a second TAC associated with Houston, Texas. Similarly, a second SMF may be configured to be a primary SMF for the second TAC associated with Houston, and to be a backup SMF for the first TAC associated with Dallas. In this example, if the first SMF is taken offline, the primary SMF for UEs located in Dallas can become unavailable. However, an AMF may cause UEs located in Dallas to be served by the second SMF, because the second SMF is a backup SMF for the first TAC associated with Dallas.

Assigning a UE associated with a TAC to a backup SMF when the primary SMF for the TAC is unavailable can prevent the UE from losing access to network services. However, network elements that implement the backup SMF for the TAC may be located farther away from the UE than network elements that implement the primary SMF for the TAC. Network traffic associated with the UE may accordingly be routed over longer distances through the backup SMF, relative to routing such network traffic through the primary SMF, which can increase latency metrics, decrease throughput metrics, and/or otherwise negatively impact user experiences, network operations, and/or other metrics. This may, for example, negatively impact a latency-sensitive application executed by the UE.

Accordingly, it can be beneficial to return UEs that have been assigned to backup SMFs to primary SMFs for corresponding TACs soon after the primary SMFs become available, because the primary SMFs handling traffic for the UEs can result in lower latencies, higher throughputs, and/or other benefits relative to the backup SMFs handling traffic for the UEs. Returning UEs from backup SMFs to primary SMFs for corresponding TACs soon after the primary SMFs become available can also reduce overall loads on the backup SMFs, and/or otherwise improve efficiencies in the telecommunication network.

Conventionally however, UEs that have been assigned to backup SMFs for TACs may remain connected to the backup SMFs for relatively long periods of time after the primary SMF's for those TACs become available again. For example, a UE that has been assigned to a backup SMF for a TAC, because the primary SMF for that TAC was unavailable, can remain connected to the backup SMF until the UE re-attaches to the telecommunication network and an AMF re-assigns the UE to the now-available primary SMF for the TAC. In many cases, such a re-attachment of a UE to the telecommunication network may be triggered by an event that is unrelated to the primary SMF for a TAC becoming available after a period of unavailability. For instance, a UE may re-attach to the telecommunication network when the UE is mobile and changes locations, or when the UE disconnects from the telecommunication network and then reconnects to the telecommunication network for an unrelated reason. Accordingly, a UE that is associated with a particular TAC and has been connected to a backup SMF for that TAC can remain connected to the backup SMF for a relatively long period of time after the primary SMF for the TAC becomes available, even though the primary SMF became available and could have been handling traffic for the UE with lower latencies, higher throughputs, and/or other benefits relative to the traffic being handled by the backup SMF.

The systems and methods described herein allow a backup SMF associated with a TAC to discover if and/or when a primary SMF associated with the TAC is available. When the backup SMF discovers that the primary SMF associated with the TAC is available, the backup SMF can cause UEs that are connected to the backup SMF, and that are associated with the TAC, to re-attach to the telecommunication network. Upon re-attaching to the telecommunication network, an AMF can assign the UEs associated with the TAC to the now-available primary SMF for the TAC. Because the backup SMF can cause such UEs to reattach to the telecommunication network and be re-assigned to the primary SMF in response to the backup SMF discovering that the primary SMF is available, the UEs can be connected to the primary SMF more quickly than if the UEs were to re-attach to the telecommunication network at later points in time in response to other unrelated events.

Example Environment

FIG. 1 shows an example 100 of a network environment in which instances of user equipment (UE) can connect to a telecommunication network to engage in voice calls, video calls, messaging, data transfers, and/or other types of services and communications. Although FIG. 1 shows a single UE 102 connected to the telecommunication network, multiple UEs and/or multiple types of UEs can connect to the telecommunication network. UEs can include mobile phones, such as a smart phones or other cellular phones. UEs can also, or alternately, include Internet of Things (IoT) devices, personal digital assistants (PDAs), media players, tablet computers, gaming devices, smart watches, hotspots, personal computers (PCs), such as laptops, desktops, or workstations, or any other type of computing or communication device.

The telecommunication network can include a core network 104. The core network 104 can register UEs, set up and manage communication sessions and services for UEs, connect UEs to other networks, such as the Internet and/or an Internet Protocol (IP) Multimedia Subsystem (IMS), and/or perform other operations associated with the UEs. The UE 102 and/or other UEs can connect to the core network 104 via an access network 106, such as a radio access network (RAN) associated with the core network 104. For example, the access network 106 can include base stations or other access points that can connect to UEs.

The UEs, the core network 104, and/or the access network 106 can support fifth generation (5G) New Radio (NR) technologies. For example, the core network 104 can be a 5G core network known as a 5G Core (5GC), and the access network 106 can be a 5G RAN that includes 5G base stations known as gNBs. UEs, such as the UE 102, can wirelessly connect to a gNB of the 5G RAN, such that the 5G RAN can connect the UEs to the core network 104. In other examples, UEs may connect to the core network 104 via a Wi-Fi and/or Internet connection, via a Long-Term Evolution (LTE) access network, or via another type of access network 106.

As discussed above, the core network 104 can be a 5G core network. The 5G core network can have a service-based system architecture in which different types of network functions operate alone and/or together to implement services. For example, network functions of the core network 104 can include at least one Access and Mobility Management Function (AMF) 108, at least one User Plane Function (UPF) 110, at least one Network Repository Function (NRF) 112, and Session Management Functions (SMFs) such as a primary SMF 114 and a backup SMF 116 as shown in FIG. 1. The core network 104 can also include other types of network functions not shown in FIG. 1, such as an Authentication Server Function (AUSF), a Network Slice Selection Function (NSSF), a Network Exposure Function (NEF), a Policy Control Function (PCF), a Unified Data Management (UDM), an Application Function (AF), and/or other network functions.

The AMF 108 can be a control plane function in the core network 104 that is configured to perform connection and/or mobility management operations associated with UEs. The UPF 110 and SMFs can process user plane data associated with UEs. The NRF 112 can be configured to determine which network functions in the core network 104 are available, and can maintain records identifying available network functions in the core network 104. The AMF 108 can be configured to query the NRF 112 to determine which SMFs are available, such that the AMF 108 can select an available SMF to handle a session for a particular UE.

For example, the UE 102 can send a Protocol Data Unit (PDU) session establishment request to the AMF 108. In response to receiving the PDU session establishment request from the UE 102, the AMF 108 can query the NRF 112 for a list of available SMFs, such as the primary SMF 114 and/or the backup SMF 116. The AMF 108 can accordingly assign the UE 102 to one of the available SMFs. The assigned SMF can create a PDU session for the UE 102 in response to the PDU session establishment request, and can manage the PDU session in conjunction with the UPF 110.

Individual SMF s can be associated with a set of tracking area codes (TACs) for different tracking areas. A tracking area can be a geographical region where UEs may be located. An SMF can be configured to handle sessions for UEs associated with multiple TACs, such as a first TAC 118 and a second TAC 120 as shown in FIG. 1. Although FIG. 1 shows an example with two TACs, in other examples SMF s can be configured to handle sessions for UEs associated with more than two TACs.

A particular SMF can be configured with different priority values for different TACs. An SMF can be a primary SMF for the highest-priority TAC indicated by the priority values associated with the SMF, and can be a backup SMF for one or more lower-priority TACs indicated by the priority values. In some examples, the priority values can be integers, with lower integer values indicating higher priority levels. For examples, an SMF can be a primary SMF for a TAC that has a priority of "1" in the priority values associated with the SMF.

For example, the primary SMF 114 shown in FIG. 1 may be configured with priority values indicating that, although the primary SMF 114 can handle sessions for UEs associated with either the first TAC 118 or the second TAC 120, the first TAC 118 is a higher priority than the second TAC 120 for the primary SMF 114. Accordingly, the primary SMF 114 shown in FIG. 1 can be the primary SMF for UEs associated with the first TAC 118, and can be a backup SMF for UEs associated with the second TAC 120.

Similarly, the backup SMF 116 shown in FIG. 1 can be configured with priority values indicating that the second TAC 120 is a higher priority than the first TAC 118 for the backup SMF 116. Accordingly, the backup SMF 116 shown in FIG. 1 can be the primary SMF for UEs associated with the second TAC 120, and can be a backup SMF for UEs associated with the first TAC 118.

In some examples, the priority values associated with TACs for a particular SMF can be based at least in part on proximity of the particular SMF to the corresponding tracking areas. For instance, network elements that implement the primary SMF 114 for the first TAC 118 may be located in, or relatively close to, a first tracking area associated with the first TAC 118, and may be farther away from a second tracking area associated with the second TAC 120. Accordingly, the primary SMF 114 for the first TAC 118 may be able to provide lower latencies, higher throughputs, and/or other benefits to closer UEs that are located in the first tracking area associated with the first TAC 118 than to farther-away UEs that are located in the second tracking area associated with the second TAC 120. Similarly, network elements that implement the backup SMF 116 for the first TAC 118 may be located in, or relatively close to, the second tracking area associated with the second TAC 120 that is the highest-priority TAC for the backup SMF 116, and may be farther away from the first tracking area associated with the first TAC 118. Accordingly, the backup SMF 116 may be able to provide lower latencies, higher throughputs, and/or other benefits to closer UEs that are located in the second tracking area associated with the second TAC 120 than to farther-away UEs that are located in the first tracking area associated with the first TAC 118.

In situations in which the primary SMF 114 for the first TAC 118 goes offline, or otherwise becomes unavailable, the AMF 108 can assign UEs associated with the first TAC 118 to the backup SMF 116 for the first TAC 118. As discussed above, the backup SMF 116 can be a primary SMF for the second TAC 120, but also can be a backup SMF for the first TAC 118. Accordingly, the backup SMF 116 can handle traffic for UEs in a tracking area associated with the first TAC 118. For example, if the UE 102 shown in FIG. 1 is in the tracking area associated with the first TAC 118, but the primary SMF 114 for the first TAC 118 is unavailable, the AMF 108 can assign the UE 102 to the backup SMF 116 for the first TAC 118. The UE 102 can accordingly connect to the backup SMF 116, for instance via the UPF 110, and the backup SMF 116 can manage communication sessions for the UE 102.

However, when the backup SMF 116 handles sessions for UEs associated with the first TAC 118, an overall load on the backup SMF 116 may increase because the backup SMF 116 can also be handling sessions for UEs associated with the second TAC 120 that is a higher priority for the backup SMF 116. Additionally, as discussed above, network elements that implement the backup SMF 116 for the first TAC 118 can be located farther away from UEs associated with the first TAC 118 than network elements that implement the primary SMF 114 for the first TAC 118, which may lead to an increase in latency metrics, a decrease in throughput metrics, and/or other impacts on network traffic for the UEs associated with the first TAC 118 relative to if the primary SMF 114 handled that network traffic. Accordingly, the backup SMF 116 can be configured to determine if and/or when the primary SMF 114 for the first TAC 118 is available, such that UEs associated with the first TAC 118 can be transitioned from the backup SMF 116 to the primary SMF 114 to reduce the load on the backup SMF 116, and/or improve latency metrics, throughput metrics, and/or other metrics associated with those UEs.

The backup SMF 116 for the first TAC 118 can be configured to periodically or occasionally determine how many UEs, connected to the backup SMF 116, are associated with the lower-priority first TAC 118. In some examples, the backup SMF 116 can determine how many connected UEs are associated with the lower-priority first TAC 118 once per hour, once every thirty minutes, or on any other configurable schedule.

The backup SMF 116 can also be configured to determine whether the number of connected UEs that are associated with the lower-priority first TAC 118 meets or exceeds a threshold value. The threshold value can be configurable by an operator of the core network, and may be based on a number of UEs, a percentage of the total number of UEs that the backup SMF 116 can handle concurrently, or any other value. As a non-limiting example, the threshold value can be set to 30,000 UEs, or any other higher or lower number of UEs. As another non-limiting example, the threshold value can be set to a number of UEs that is 33%, or any other higher or lower percentage, of the total number of UEs that the backup SMF 116 can handle concurrently.

If the backup SMF 116 determines that the number of connected UEs associated with the lower-priority first TAC 118 meets or exceeds the threshold value, the backup SMF 116 can transmit an SMF query 122 to the NRF 112. As described above, the NRF 112 can maintain records of available network functions in the core network 104, including available SMFs. The SMF query 122 can accordingly request, from the NRF 112, an SMF list 124 that indicates any other SMFs that are available and are configured to handle UEs associated with the first TAC 118. For example, the SMF query 122 can be a discovery message that has a target network function type value set to "SMF," and that identifies the first TAC 118. The SMF query 122 can also indicate other information, such as a network slice identifier, a data network name (DNN), and/or other information associated with the first TAC 118.

The NRF 112 can respond to the SMF query 122 from the backup SMF 116 by returning the SMF list 124 to the backup SMF 116. The SMF list 124 can identify any other SMFs that are configured to handle UEs associated with the first TAC 118, and can indicate the priority values that those SMFs associate with the first TAC 118 and/or other TACs. For example, if records maintained by the NRF 112 indicate that the primary SMF 114 is available, the SMF list 124 can identify the primary SMF 114, and indicate that the primary SMF 114 associates the first TAC 118 with a highest-priority value of "1." However, if the records maintained by the NRF 112 indicate that the primary SMF 114 for the first TAC 118 is not available, the SMF list 124 can omit the primary SMF 114, but may list one or more other SMFs that can also act as backup SMFs for the first TAC 118.

If the SMF list 124 received by the backup SMF 116 from the NRF 112 only lists other SMFs that associate the first TAC 118 with the same priority or a lower priority than the backup SMF 116, the backup SMF 116 can determine that the primary SMF 114 for the first TAC 118 is not currently available in the core network 104. Accordingly, the backup SMF 116 can continue handling sessions for connected UEs that are associated with the first TAC 118. As an example, if the backup SMF 116 associates the first TAC 118 with a priority value of "2" as shown in FIG. 1, and the SMFs listed in the SMF list 124 all associate the first TAC 118 with a priority value of "2" or above, those SMFs can be alternate backup SMFs for the first TAC 118. Accordingly, the backup SMF 116 can continue handling UEs associated with the first TAC 118, rather than attempting to transition the UEs to another backup SMF for which the first TAC 118 is an equal or lower priority. The backup SMF 116 can wait for an hour, or another predetermined period of time, before repeating the process to determine the number of connected UEs associated with the first TAC 118 and/or requesting a new SMF list associated with the first TAC 118 that may include the primary SMF 114 if the primary SMF 114 has become available by that time.

However, if the SMF list 124 received by the backup SMF 116 from the NRF 112 lists an SMF that associates the first TAC 118 with a higher priority than the backup SMF 116 associates with the first TAC 118, the backup SMF 116 can determine that the primary SMF 114 for the first TAC 118 may be available. As an example, if the backup SMF 116 associates the first TAC 118 with a priority value of "2" as shown in FIG. 1, and an SMF listed in the SMF list 124 associates the first TAC 118 with a higher priority value of "1," that SMF can be the primary SMF 114 for the first TAC 118.

Accordingly, if the SMF list 124 received by the backup SMF 116 from the NRF 112 lists an SMF that associates the first TAC 118 with a higher priority than the backup SMF 116 associates with the first TAC, the backup SMF 116 can send detach commands 126 that cause UEs associated with the first TAC 118 to disconnect from the backup SMF 116 and the core network 104, and then re-attach to the core network 104. The detach commands 126 can be Non-Access Stratum (NAS) messages that include detach flags or other instructions that cause UEs to detach from the core network 104, "delete bearer" messages that cause the UPF 110, the AMF 108, and/or other network elements to delete network bearers associated with the UEs, or any other type of command or message that causes the UEs to detach from the core network 104 and/or that causes network elements to force the UEs to detach from the core network 104.

After UEs associated with the first TAC 118 disconnect from the backup SMF 116 and/or the core network 104 in response to the detach commands 126, the UEs can re-attach to the core network 104. Individual UEs may, for instance, attempt to re-attach to the core network 104 substantially immediately after detaching from the network, or at later points in time when the UEs next attempt to send or receive data via the telecommunication network.

When UEs associated with the first TAC 118 re-attach to the core network 104, the AMF 108 can determine, by consulting the NRF 112, that the primary SMF 114 for the first TAC 118 is available. The AMF 108 can assign the re-attached UEs associated with the first TAC 118 to the primary SMF 114 for the first TAC 118 instead of the backup SMF 116. Accordingly, the UEs associated with the first TAC 118 can be effectively transitioned from the backup SMF 116 for the first TAC 118 to the primary SMF 114 for the first TAC 118 as soon as the backup SMF 116 discovers, based on the SMF list 124 received from the NRF 112, that the primary SMF 114 may be available in the core network 104. Transitioning the UEs associated with the first TAC 118 from the backup SMF 116 to the primary SMF 114, based on a determination by the backup SMF 116 that the primary SMF 114 is available, can reduce the overall load on the backup SMF 116, and can improve latency metrics, throughput metrics, and/or other metrics associated with network traffic for the transitioned UEs.

In some examples, if the SMF list 124 received by the backup SMF 116 from the NRF 112 lists an SMF that associates the first TAC 118 with a higher priority than the backup SMF 116 associates with the first TAC 118, but that SMF is not the primary SMF 114 for the first TAC 118, the SMF may be a better alternate backup SMF for the first TAC 118. Accordingly, the backup SMF 116 can send detach commands 126 that cause UEs associated with the first TAC 118 to detach from the core network 104 and then re-attach to the core network, such that the AMF 108 can assign the UEs to another backup SMF that associates the first TAC 118 with a higher priority than the backup SMF 116 associates with the first TAC 118. As an example, if the backup SMF 116 associates the first TAC 118 with a priority value of "3", and an SMF listed in the SMF list 124 associates the first TAC 118 with a higher priority value of "2," that SMF may be an alternate backup SMF for the first TAC 118 that is closer to the tracking area associated with the first TAC 118 than the backup SMF 116. Accordingly, because the alternate backup SMF may be able to handle traffic of UEs associated with the first TAC 118 with improved latency metrics, throughput metrics, and/or other metrics relative to that traffic being handled by the backup SMF 116, the backup SMF 116 can output detach commands 126 that cause those UEs to re-attach to the core network 104 and be connected to the alternate SMF by the AMF 108.

In some examples, if the backup SMF 116 for the first TAC 118 determines from the SMF list 124 that the primary SMF 114 for the first TAC 118, or a higher-priority backup SMF for the first TAC 118, may be available, the backup SMF 116 can send detach commands 126 associated with a subset of the UEs connected to the backup SMF 116 that are associated with the first TAC 118. The backup SMF 116 can also monitor subsequent assignments of UEs to the backup SMF 116 by the AMF 108 to determine if the AMF 108 assigns any UEs in the subset back to the backup SMF 116. If any UEs in the subset do return to the backup SMF 116, that situation may indicate that the primary SMF 114 for the first TAC 118, or a higher-priority backup SMF for the first TAC 118, is not actually available. For example, although the SMF list 124 received from the NRF 112 may have indicated that a higher-priority SMF for the first TAC 118 is available, an internal issue with that SMF may prevent the SMF from accepting new connections from UEs, such that the AMF 108 redirects UEs back to the backup SMF 116.

As a non-limiting example, if the backup SMF 116 determines that 20,000 UEs associated with the first TAC 118 are connected to the backup SMF 116, and determines from the SMF list 124 that the primary SMF 114 for the first TAC 118 may be available, the backup SMF 116 can send detach commands 126 associated with a subset of 100 of those 20,000 UEs. If none of those 100 UEs are assigned back to the backup SMF 116, for instance within a threshold period of time, the backup SMF 116 can determine that the AMF 108 likely successfully re-assigned those 100 UEs to the primary SMF 114 for the first TAC 118, and therefore can determine that the primary SMF 114 is currently available in the core network 104. However, if any or all of the subset of 100 UEs are assigned back to the backup SMF 116, the backup SMF 116 can determine that the primary SMF 114 for the first TAC 118 is likely not currently available in the core network 104, despite the records maintained by the NRF 112.

In some examples, the backup SMF 116 can select a subset of UEs, for which detach commands 126 are to be sent, from among idle UEs associated with the first TAC 118. For example, the backup SMF 116 can be configured to avoid sending detach commands 126 associated with UEs that are in an active state, for instance because the UEs are engaged in active calls or other active communication sessions. However, the backup SMF 116 can identify idle UEs that are not currently engaged in active communication sessions, and can send detach commands 126 associated with a subset of those idle UEs, instead of sending detach commands 126 that may disrupt active calls or other active communication sessions associated with active UEs.

As discussed above, if the backup SMF 116 sends detach commands 126 associated with a subset of UEs associated with the first TAC 118, and none of those UEs are assigned back to the backup SMF 116, the backup SMF 116 can determine that the primary SMF 114 (or a higher-priority backup SMF) for the first TAC 118 is currently available. The backup SMF 116 can accordingly periodically or occasionally send detach commands 126 associated with additional subsets of the UEs associated with the first TAC 118 to, over time, cause some or all of those UEs to transition from the backup SMF 116 to the primary SMF 114 (or the higher-priority backup SMF) for the first TAC 118.

For example, if an initial subset of 100 UEs associated with the first TAC 118 detaches from the backup SMF 116 in response to detach commands 126, and does not return to the backup SMF 116, the backup SMF 116 for the first TAC 118 can determine that the primary SMF 114 or a higher-priority backup SMF for the first TAC 118 is likely available. The backup SMF 116 can accordingly, over time, send additional detach commands 126 to additional subsets of 100 UEs associated with the first TAC 118, or progressively larger subsets of UEs associated with the first TAC 118, to over time transition some or all of the overall number of UEs associated with the first TAC 118 to the primary SMF 114 or a higher-priority backup SMF for the first TAC 118.

If the backup SMF 116 sends detach commands 126 associated with a subset of UEs associated with the first TAC 118, but one or more of the UEs in that subset are assigned back to the backup SMF 116, the backup SMF 116 can determine that the primary SMF 114 (or a higher-priority backup SMF) for the first TAC 118 is not currently available in the core network 104. In this situation, the backup SMF 116 can output an alert message to an operator of the core network 104, to the NRF 112, and/or to another destination. The alert message can indicate that the primary SMF 114 or higher-priority backup SMF may not be available, or may be experiencing errors. A network operator can accordingly use the alert message output by the backup SMF 116 to initiate an investigation and/or fixes associated with the primary SMF 114 or the higher-priority backup SMF. The NRF 112 may similarly use the alert message output by the backup SMF 116 to update availability records associated with the primary SMF 114 or the higher-priority backup SMF, or to take further steps to determine the current status of the primary SMF 114 or the higher-priority backup SMF.

Figure 2:
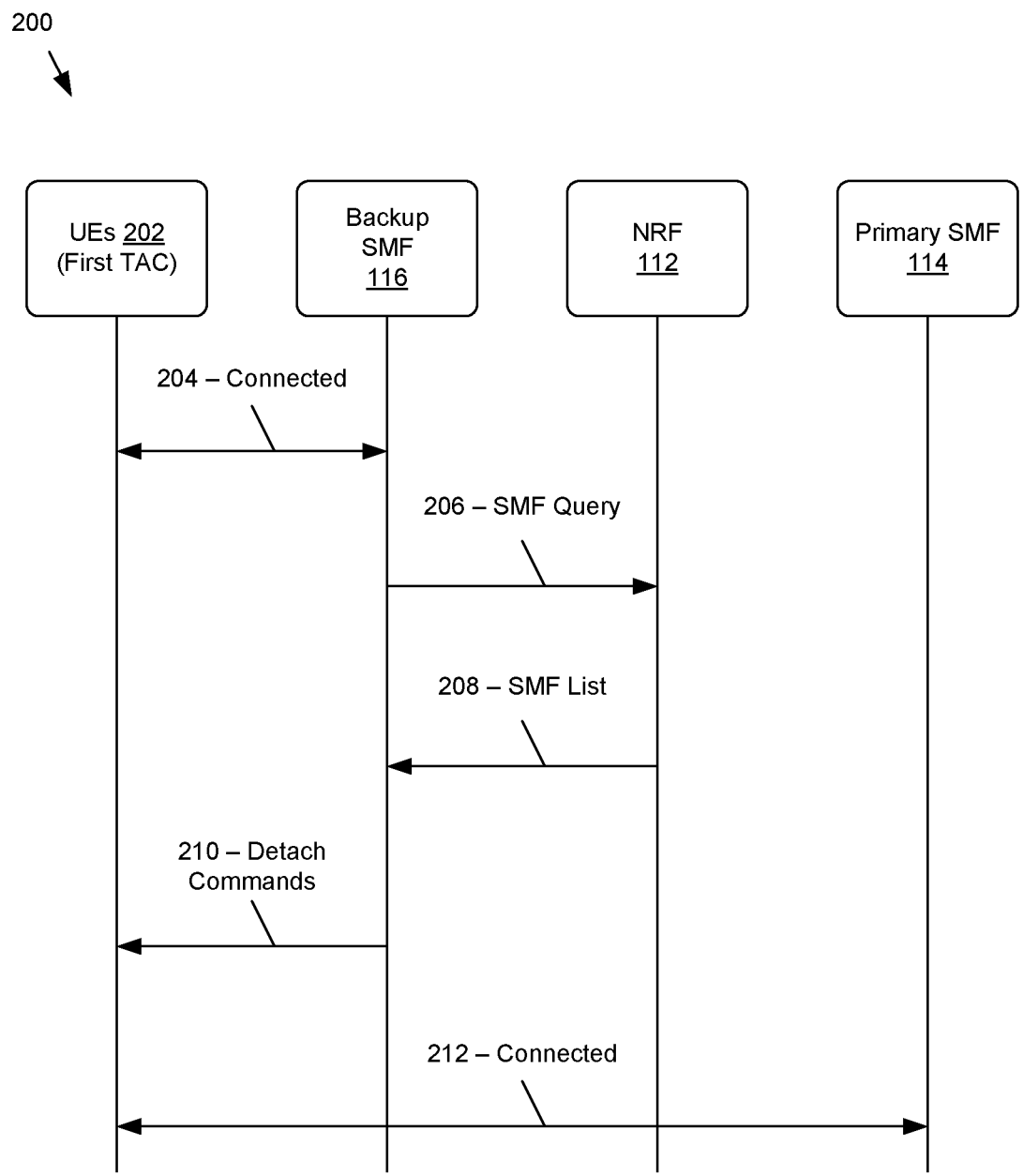
FIG. 2 shows a sequence diagram of a process a backup SMF can use to transition UEs associated with a first TAC to the primary SMF for the first TAC, if and/or when the primary SMF becomes available.

FIG. 2 shows a sequence diagram 200 of a process the backup SMF 116 can use to transition UEs 202 associated with the first TAC 118 to the primary SMF 114 for the first TAC 118, if and/or when the primary SMF 114 becomes available. At 204, a set of UEs 202 associated with the first TAC 118 can be connected to the backup SMF 116. The UEs 202 can be similar to the UE 102 shown in FIG. 1. The UEs 202 can be associated with the first TAC 118, for instance because the UEs 202 are located in a tracking area that corresponds the first TAC 118. However, although the UEs 202 can be associated with the first TAC 118, one or more AMFs may have assigned the UEs 202 to the backup SMF 116 for the first TAC 118 because the primary SMF 114 for the first TAC 118 was at least temporarily unavailable.

At 206, the backup SMF 116 can send the SMF query 122 to the NRF 112. The SMF query 122 can indicate the first TAC 118, and request the SMF list 124 of SMFs configured to handle UEs 202 associated with the first TAC 118.

At 208, the NRF 112 can return the SMF list 124 to the backup SMF 116. If the primary SMF 114 has become available, the primary SMF 114 can be included in the SMF list 124 received by the backup SMF 116 from the NRF 112. The SMF list 124 can also indicate that the primary SMF 114 associates the first TAC 118 with a higher priority than the backup SMF 116 associates with the first TAC 118, such that the backup SMF 116 can determine that the UEs 202 connected to the backup SMF 116 should be transitioned to the primary SMF 114.

Accordingly, at 210, the backup SMF 116 can send detach commands 126 associated with one or more of the UEs 202. The detach commands 126 can cause the corresponding UEs 202 to detach from the core network 104 and then re-attach to the core network 104. Upon re-attaching to the core network 104, one or more AMFs can assign the UEs 202 associated with the first TAC 118 to the now-available primary SMF 114 for the first TAC 118, instead of to the backup SMF 116. The UEs 202 can be connected to the primary SMF 114 at 212, and the primary SMF 114 may be able to handle network traffic associated with the UEs with improved latency metrics, throughput metrics, and/or other metrics relative to if the network traffic was handled by the backup SMF 116.

As discussed above, in some situations the SMF list 124 received at 208 may not include the primary SMF 114, for instance because the primary SMF 114 is not yet available. In these situations, the backup SMF 116 can continue serving the UEs 202 at least until the backup SMF 116 sends a subsequent SMF query 122, and receives a subsequent SMF list 124 indicating that the primary SMF 114 has become available.

Additionally, at 210 the backup SMF 116 can send detach commands 126 at different times in association with different subsets of idle UEs 202, such that the backup SMF 116 can determine whether any of those UEs 202 are assigned back to the backup SMF 116 instead of being re-assigned to the primary SMF 114. If a subset of the UEs 202 associated with sent detach commands 126 is not assigned back to the backup SMF 116 (indicating that the UEs 202 have successfully been re-assigned to the primary SMF 114), the backup SMF 116 can send additional detach commands 126 to additional subsets of the UEs 202. Accordingly, the backup SMF 116 can progressively cause some or all of the UEs 202 to transition from the backup SMF 116 to the primary SMF 114 over time.

Example Architecture

Figure 3:
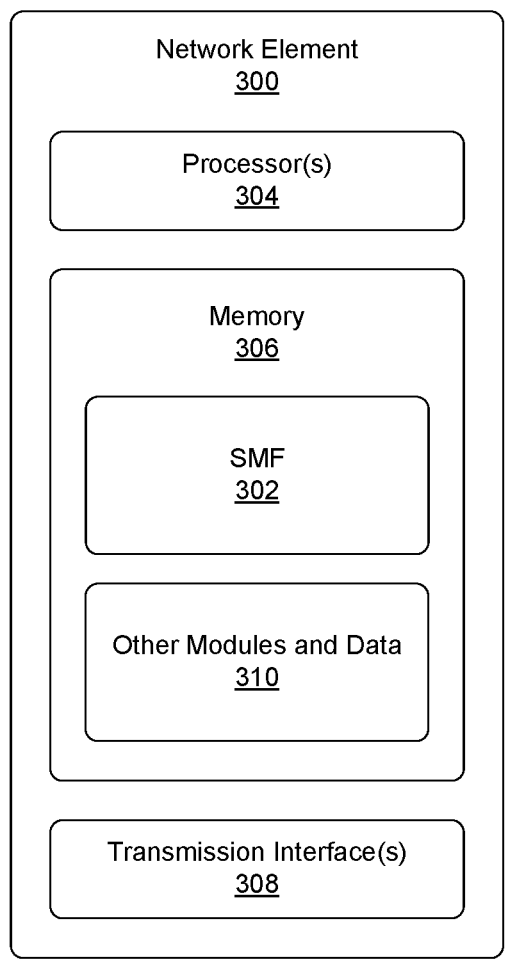
FIG. 3 shows an example system architecture for a network element configured to execute an SMF in a core network.

FIG. 3 shows an example system architecture for a network element 300 configured to execute an SMF 302 in the core network 104. For example, the SMF 302 can be the primary SMF 114, the backup SMF 116, or another SMF. As shown, the network element 300 can include processor(s) 304, memory 306, and transmission interface(s) 308. In some examples, the network element 300 can be distinct hardware for the SMF 302. However, in other examples, the network element 300 can be one or more servers, computing systems, or other computing devices that execute the SMF 302 as a software application or executes a virtual instance of the SMF 302.

In various examples, the processor(s) 304 can be a central processing unit (CPU), a graphics processing unit (GPU), both CPU and GPU, or any other type of processing unit. Each of the one or more processor(s) 304 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 304 may also be responsible for executing all computer-executable instructions and/or computer applications stored in the memory 306.

In various examples, the memory 306 can include system memory, which may be volatile (such as RAM), non-volatile (such as ROM, flash memory, etc.) or some combination of the two. The memory 306 can also include additional data storage devices (removable and/or non-removable) such as, for example, magnetic disks, optical disks, or tape. Memory 306 can further include non-transitory computer-readable media, such as volatile and nonvolatile, removable and non-removable media implemented in any method or technology for storage of information, such as computer-readable instructions, data structures, program modules, or other data. For example, the memory 306 can store software or firmware elements, such as computer-readable instructions that are executable by the one or more processors 304. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, DVD or other optical storage, magnetic cassettes, magnetic tape, magnetic disk storage or other magnetic storage devices, or any other non-transitory medium which can be used to store the desired information and which can be accessed by the network element 300. Any such non-transitory computer-readable media may be part of the network element 300.

The memory 306 can store computer-readable instructions and/or other data associated with operations of the network element 300, including operations of the SMF 302. As an example, the memory 306 can store a list of TACs, and corresponding priority values, associated with the SMF 302. As another example, the memory 306 can store computer-readable instructions that can cause the SMF 302 to determine how many UEs connected to the SMF 302 are associated with TACs that are not the highest priority TAC for the SMF 302, request the SMF list 124 from the NRF 112, output the detach commands 126 and/or other messages, and/or perform other operations described herein. The memory 306 can also store other modules and data 310, which can be utilized by the network element 300 to perform or enable performing any action taken by the network element 300. The modules and data 310 can include a platform, operating system, firmware, and/or applications, and data utilized by the platform, operating system, firmware, and/or applications.

The transmission interface(s) 308 can include one or more modems, receivers, transmitters, antennas, error correction units, symbol coders and decoders, processors, chips, application specific integrated circuits (ASICs), programmable circuit (e.g., field programmable gate arrays), firmware components, software components, and/or other components through which the SMF 302 can send data to, and/or receive data from, other network elements, other network functions, UEs, and/or other elements. For example, the network element 300 can use transmission interface(s) 308 to transmit the SMF query 122 to the NRF 112 and receive the SMF list 124 from the NRF 112.

Example Operations

Figure 4:
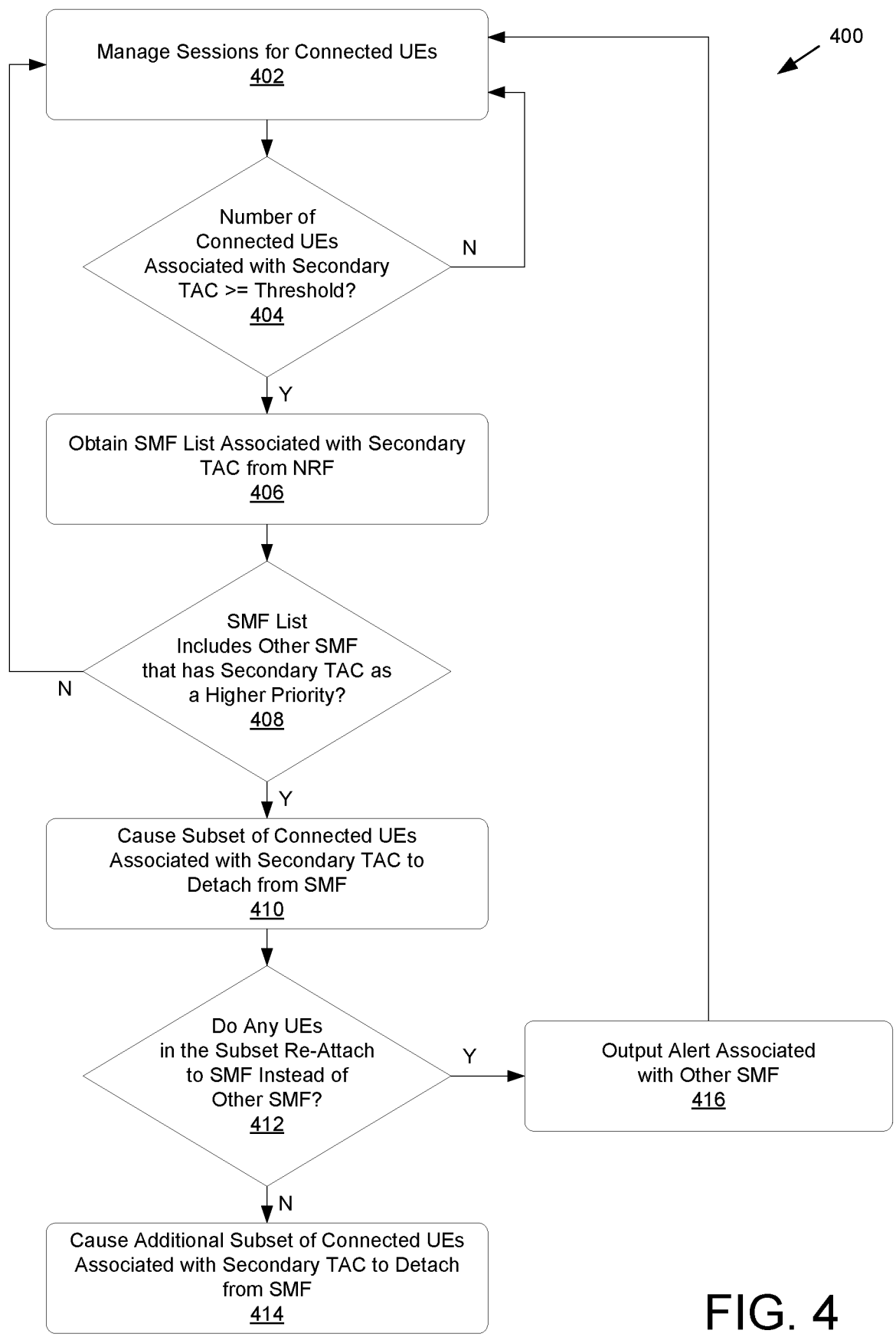
FIG. 4 shows a flowchart of an example method that an SMF can use to determine that the SMF is acting as a backup SMF for at least some connected UEs, and to transition those UEs to a different higher-priority SMF.

FIG. 4 shows a flowchart of an example method 400 that an SMF can use to determine that the SMF is acting as a backup SMF for at least some connected UEs, and to transition those UEs to a different higher-priority SMF. For example, the method 400 can be performed by the backup SMF 116 shown in FIG. 1 and FIG. 2.

At block 402, the SMF can manage sessions for a set of UEs. The SMF can be configured to manage sessions for UEs associated with multiple TACs. The SMF can also be configured with priority values indicating that one of the TACs is a highest-priority primary TAC for the SMF. The priority values can also indicate that one or more of the TACs are lower-priority secondary TACs for the SMF. For example, if the SMF is the backup SMF 116 shown in FIG. 1, the second TAC 120 can be the highest-priority primary TAC for the SMF, and the first TAC 118 can be a lower-priority secondary TAC for the SMF. Accordingly, at block 402, the SMF may serve as a primary SMF to manage sessions for some UEs that are associated with the highest-priority primary TAC for the SMF, but may also serve as a backup SMF to manage sessions for other UEs that are associated with the lower-priority secondary TACs for the SMF.

At block 404, the SMF can whether a number of UEs that are connected to the SMF, and that are associated with a secondary TAC for the SMF, meets or exceeds a threshold value. Accordingly, the SMF can determine whether the SMF is serving as a backup SMF for at least a threshold number of UEs associated with the secondary TAC. As an example, if the SMF is the backup SMF 116 shown in FIG. 1, which has the first TAC 118 as a lower-priority secondary TAC, the SMF can determine whether a number of UEs connected to the SMF that are associated with the first TAC 118 exceeds the threshold value. The threshold value can be based on a predefined number of UEs, a percentage of the total number of UEs that the SMF can handle concurrently, or any other value.

If the SMF determines that the number of connected UEs associated with the secondary TAC is less than the threshold value (Block 404—No), the SMF can continue managing the sessions for the connected UEs at block 402. The SMF can wait for a predetermined period of time, or wait until a time indicated by a predefined schedule, before again checking at block 404 whether the number of connected UEs associated with the secondary TAC meets or exceeds the threshold value.

If the SMF determines that the number of connected UEs associated with the secondary TAC does meet or exceed the threshold value (Block 404—Yes), the SMF can obtain an SMF list associated with the secondary TAC from the NRF 112. For example, the SMF can send an SMF query that identifies the secondary TAC and requests a list of SMFs that are configured to handle UEs associated with the secondary TAC, to the NRF 112. The NRF 112 can accordingly return an SMF list that identifies SMFs that, according to records maintained by the NRF 112, are also associated with the secondary TAC and are currently available in the core network 104. The SMF list can also indicate priority values that the available SMF's associate with the secondary TAC.

At block 408, the SMF can determine whether the SMF list indicates that at least one other SMF is available that associates the secondary TAC with a higher priority than the SMF associates with the secondary TAC. For example, if the SMF associates the secondary TAC with a priority value of "2," and lower integer values indicate higher priority values, the SMF can determine whether any of the SMFs identified in the SMF list associate the secondary TAC with a priority value of "1."

If the SMF list received from the NRF 112 does not include any SMFs that associate the secondary TAC with a higher priority than the SMF associates with the secondary TAC (Block 408—No), the SMF can continue managing the sessions for the connected UEs at block 402. The SMF can wait for a predetermined period of time, or wait until a time indicated by a predefined schedule, before again checking at block 404 whether the number of connected UEs associated with the secondary TAC meets or exceeds the threshold value and, if so, obtaining a new SMF list from the NRF at block 406.

However, if the SMF list received from the NRF 112 does include at least one other SMF that associates the secondary TAC with a higher priority than the SMF associates with the secondary TAC (Block 408—Yes), the SMF can determine that the primary SMF associated with that TAC, or a higher-priority backup SMF associated with that TAC, may currently be available in the core network 104. The SMF can accordingly determine to attempt to transfer the UEs associated with the secondary TAC from the SMF to the other SMF that may now be available and, due to the other SMF associating the secondary TAC with a higher priority than the SMF, may be better suited to handle UEs associated with the secondary TAC.

Accordingly, at block 410, the SMF can cause a subset of the UEs that are connected to the SMF, and are associated with the TAC the SMF considers to be a secondary TAC, to detach from the SMF and the core network 104. For example, the SMF can send detach commands 126 associated with the subset of the UEs to the UEs, to UPFs, to AMFs, and/or other network elements. The detach commands 126 can cause the UEs to detach from the SMF and the core network 104, or cause the other network elements to force the UEs to detach from the SMF and the core network 104. The SMF can include currently-idle UEs in the subset, such that the SMF can avoid sending detach commands 126 associated with currently-active UEs that may result in a disruption of active communication sessions associated with the active UEs.

After the subset of UEs, associated with the TAC considered by the SMF to be the secondary TAC, are detached from the core network 104 in response to the detach commands 126, the UEs can re-attach to the core network 104. One or more AMFs can assign the re-attached UEs to SMFs. If another SMF is available in the core network 104 that associates the secondary TAC of the SMF with a higher priority than the SMF associates with the secondary TAC, the AMFs can assign the re-attached UEs to that other SMF instead of the SMF. However, if such a higher-priority SMF for the secondary TAC is not actually available in the core network 104 or is experiencing issues that prevent the higher-priority SMF from handling traffic for the re-attached UEs, the AMFs may assign one or more of the UEs in the subset back to the SMF.

Accordingly, at block 412, the SMF can wait to determine whether any of the UEs in the subset, caused at block 410 to detach from the core network 104, re-attach to the SMF instead of another SMF. For example, the SMF may maintain a log of which UEs were in the subset, and determine whether any of those UEs re-attach to the SMF within a predetermined period of time after detaching from the SMF.

If the SMF determines that none of the UEs in the subset re-attach to the SMF (Block 412—No), the SMF can cause additional subsets of the UEs that are connected to the SMF, and are associated with the TAC the SMF considers to be a secondary TAC, to detach from the SMF and the core network 104. For example, the SMF can send additional detach commands 126 associated with additional subsets of the UEs to the UEs, to UPFs, to AMFs, and/or other network elements.

In some examples, after the SMF sends detach commands 126 for a particular subset of UEs at block 414, the SMF determine at block 412 whether any of the UEs in that particular subset re-attach to the SMF. If none of the UEs in that particular subset re-attach to the SMF, the SMF can send additional detach commands 126 associated with another subset of UEs at block 414.

The SMF can also be configured to send additional detach commands 126 associated with additional subsets of UEs at block 414 at periodic or occasional intervals, and/or progressively increase the sizes of each subsequent subset of UEs. Accordingly, over time the SMF can cause some or all of the UEs that are connected to the SMF and that are associated with the secondary TAC to detach from the SMF and be re-assigned to another higher-priority SMF for the secondary TAC, if a historical pattern shows that detached UEs associated with the secondary TAC are not being re-assigned to the SMF.

If the SMF determines that one or more UEs in a subset, that the SMF caused to detach from the SMF, does re-attach to the SMF (Block 412—Yes), the SMF can determine that although the SMF list received from the NRF indicated that a higher-priority SMF for the secondary TAC was available, that other SMF may actually be offline or be experiencing issues that prevent UEs from attaching to the other SMF. Accordingly, at block 416, the SMF can output an alert associated with the other SMF to a network operator, the NRF 112, and/or another destination.

The alert sent by the SMF at block 416 can identify the other SMF, and/or indicate that the other SMF may be offline or experiencing problems. The alert can notify a network operator of a potential problem with the other SMF, such that the network operator can investigate those problems and/or fix the other SMF. Similarly, the alert may notify the NRF 112 that availability records about the other SMF maintained at the NRF 112 may be out of date or incorrect, and cause the NRF 112 to query the other SMF and/or otherwise determine the status of the other SMF.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method, comprising:
   determining, by a backup session management function (SMF) for a first tracking area code (TAC), a number of user equipments (UEs) associated with the first TAC that are connected to the backup SMF, wherein the backup SMF is a primary SMF or higher priority SMF for a second TAC that is different from the first TAC;
   determining, by the backup SMF, that the number of UEs meets or exceeds a threshold value;
   in response to determining that the number of UEs meets or exceeds the threshold value, obtaining, by the backup SMF, an SMF list associated with the first TAC from a network repository function (NRF);
   determining, by the backup SMF, that:
      the SMF list identifies a different SMF associated with the first TAC, and
      the different SMF associates the first TAC with a higher priority than the backup SMF associates with the first TAC; and
   sending, by the backup SMF, detach commands associated with at least a subset of the UEs associated with the first TAC, wherein the detach commands cause UEs in the at least the subset of the UEs associated with the first TAC to detach from the backup SMF and a core network, and re-attach to the core network.

2. The method of claim 1, wherein the at least the subset of the UEs associated with the first TAC includes idle UEs that are not associated with active communication sessions.

3. The method of claim 1, further comprising:
determining, by the backup SMF, that none of the UEs in the at least the subset of the UEs associated with the first TAC are assigned back to the backup SMF after the UEs re-attach to the core network; and
sending, by the backup SMF, additional detach commands associated with one or more additional subsets of the UEs associated with the first TAC.

4. The method of claim 3, wherein the backup SMF progressively increases sizes of the one or more additional subsets.

5. The method of claim 1, further comprising:
determining, by the backup SMF, that at least one of the UEs in the subset of UEs is assigned back to the backup SMF, instead of the different SMF, after the UEs re-attach to the core network; and
sending, by the backup SMF, an alert associated with the different SMF to at least one of a network operator or the NRF.

6. The method of claim 1, wherein the different SMF is a primary SMF for the first TAC.

7. The method of claim 1, wherein the different SMF is a higher-priority backup SMF for the first TAC, relative to the backup SMF.

8. The method of claim 1, wherein the backup SMF associates the first TAC with a lower priority than the second TAC.

9. A network element, comprising:
one or more processors; and
memory storing computer-executable instructions associated with a backup session management function (SMF) for a first tracking area code (TAC) that, when executed by the one or more processors, cause the one or more processors to perform operations comprising:
determining a number of user equipments (UEs) associated with the first TAC that are connected to the backup SMF;
determining that the number of UEs meets or exceeds a threshold value;
in response to determining that the number of UEs meets or exceeds the threshold value, obtaining an SMF list associated with the first TAC from a network repository function (NRF);
determining that:
the SMF list identifies a different SMF associated with the first TAC, and
the different SMF associates the first TAC with a higher priority than the backup SMF associates with the first TAC; and
sending detach commands associated with at least a subset of the UEs associated with the first TAC, wherein the detach commands cause UEs in the at least the subset of the UEs associated with the first TAC to detach from the backup SMF and a core network, and re-attach to the core network,
wherein the backup SMF is a primary SMF or higher priority SMF for a second TAC that is different from the first TAC.

10. The network element of claim 9, wherein the at least the subset of the UEs associated with the first TAC includes idle UEs that are not associated with active communication sessions.

11. The network element of claim 9, wherein the operations further comprise:
determining that none of the UEs in the at least the subset of the UEs associated with the first TAC are assigned back to the backup SMF after the UEs re-attach to the core network; and
sending additional detach commands associated with one or more additional subsets of the UEs associated with the first TAC.

12. The network element of claim 9, wherein the operations further comprise:
determining that at least one of the UEs in the subset of UEs is assigned back to the backup SMF, instead of the different SMF, after the UEs re-attach to the core network; and
sending an alert associated with the different SMF to at least one of a network operator or the NRF.

13. The network element of claim 9, wherein the different SMF is:
a primary SMF for the first TAC, or
a higher-priority backup SMF for the first TAC, relative to the backup SMF.

14. The network element of claim 9, wherein the backup SMF
associates the first TAC with a lower priority than the second TAC.

15. One or more non-transitory computer-readable media storing computer-executable instructions associated with a backup session management function (SMF) for a first tracking area code (TAC) that, when executed by one or more processors of a network element associated with the backup SMF, cause the one or more processors to:
determine a number of user equipments (UEs) associated with the first TAC that are connected to the backup SMF;
determine that the number of UEs meets or exceeds a threshold value;
obtain, in response to determining that the number of UEs meets or exceeds the threshold value, an SMF list associated with the first TAC from a network repository function (NRF);
determine that:
the SMF list identifies a different SMF associated with the first TAC, and
the different SMF associates the first TAC with a higher priority than the backup SMF associates with the first TAC; and
send detach commands associated with at least a subset of the UEs associated with the first TAC, wherein the detach commands cause UEs in the at least the subset of the UEs associated with the first TAC to detach from the backup SMF and a core network, and re-attach to the core network,
wherein the backup SMF is a primary SMF or higher priority SMF for a second TAC that is different from the first TAC.

16. The one or more non-transitory computer-readable media of claim 15, wherein the at least the subset of the UEs associated with the first TAC includes idle UEs that are not associated with active communication sessions.

17. The one or more non-transitory computer-readable media of claim 15, wherein the computer-executable instructions further cause the one or more processors to:

determine that none of the UEs in the at least the subset of the UEs associated with the first TAC are assigned back to the backup SMF after the UEs re-attach to the core network; and send additional detach commands associated with one or more additional subsets of the UEs associated with the first TAC.

18. The one or more non-transitory computer-readable media of claim 15, wherein the computer-executable instructions further cause the one or more processors to:

determine that at least one of the UEs in the subset of UEs is assigned back to the backup SMF, instead of the different SMF, after the UEs re-attach to the core network; and send an alert associated with the different SMF to at least one of a network operator or the NRF.

19. The one or more non-transitory computer-readable media of claim 15, wherein the different SMF is:

a primary SMF for the first TAC, or a higher-priority backup SMF for the first TAC, relative to the backup SMF.

20. The one or more non-transitory computer-readable media of claim 15, wherein the backup SMF associates the first TAC with a lower priority than the second TAC.

* * * * *